(12) United States Patent
Richardson et al.

(10) Patent No.: US 8,314,883 B2
(45) Date of Patent: Nov. 20, 2012

(54) MOBILE STATION HAVING A CONFIGURABLE GRIP

(75) Inventors: Nigel Richardson, Surrey (GB); Andrew Strawn, Hampshire (GB)

(73) Assignee: Nokia Corporation, Espoo (FI)

( * ) Notice: Subject to any disclaimer, the term of this patent is extended or adjusted under 35 U.S.C. 154(b) by 577 days.

(21) Appl. No.: 10/584,748

(22) PCT Filed: Dec. 13, 2004

(86) PCT No.: PCT/IB2004/004118
§ 371 (c)(1),
(2), (4) Date: Apr. 16, 2007

(87) PCT Pub. No.: WO2005/067268

PCT Pub. Date: Jul. 21, 2005

(65) Prior Publication Data

US 2007/0238493 A1    Oct. 11, 2007

(30) Foreign Application Priority Data

Dec. 24, 2003  (GB) .................................. 0330054.8

(51) Int. Cl.
*H04N 5/225* (2006.01)
(52) U.S. Cl. ...................... 348/376; 348/373; 455/575.1
(58) Field of Classification Search .................. 348/373, 348/376
See application file for complete search history.

(56) References Cited

U.S. PATENT DOCUMENTS

| | | | |
|---|---|---|---|
| 4,530,580 A * | 7/1985 | Ueda et al. .................... | 396/425 |
| 5,719,799 A * | 2/1998 | Isashi ............................ | 708/105 |
| 5,970,265 A * | 10/1999 | Schelling ..................... | 396/348 |
| 6,384,863 B1 * | 5/2002 | Bronson ....................... | 348/373 |
| 6,535,239 B1 | 3/2003 | Kim | |
| 6,549,237 B1 * | 4/2003 | Inuma et al. ............. | 348/333.06 |
| 6,636,259 B1 * | 10/2003 | Anderson et al. .......... | 348/211.3 |
| 7,359,003 B1 * | 4/2008 | Knighton et al. ............ | 348/376 |

FOREIGN PATENT DOCUMENTS

| | | |
|---|---|---|
| DE | 298 22 386 U1 | 12/1998 |
| DE | 10022577 | 11/2001 |
| EP | 1 096 771 A1 | 5/2001 |
| EP | 1 241 860 A1 | 9/2002 |
| JP | 2001/036788 | 2/2001 |
| JP | 2002/190974 | 7/2002 |
| JP | 2003-242767 A | 8/2003 |
| JP | 2003/338862 | 11/2003 |
| WO | WO03/046705 A2 | 6/2003 |
| WO | WO2004/015986 A1 | 2/2004 |

OTHER PUBLICATIONS

Great Britain Search Report, GB0330054.8, dated Oct. 14, 2004.
International Search Report, PCT/IB2004/004118, dated Apr. 28, 2005.

* cited by examiner

*Primary Examiner* — Anthony J Daniels
(74) *Attorney, Agent, or Firm* — Alston & Bird LLP

(57) ABSTRACT

A mobile communication station including a camera and having a grip for being gripped by a user during use of the communication station, the grip having a first compact configuration and a second configuration in which the grip is expanded relative to the first configuration to improve the grip of the user on the communication station when the grip is in the second expanded configuration.

23 Claims, 3 Drawing Sheets

MOBILE STATION HAVING A CONFIGURABLE GRIP

As the functionality of mobile stations increases, one emerging use of a mobile telephone is as a video capture device for recording moving images, another is the use of the product as a mobile gaming device. However, existing mobile stations have a strong voice bias and as such are currently designed to fit comfortably within the user's hand while the user makes and receives calls. Even the first generation of mobile stations with integrated digital cameras have the 'conventional' grip of a mobile station. This conventional grip is not suitable for capturing images, as it generally requires the mobile station to be gripped between the thumb and fingers of the user during filming. This is an unstable gripping position, which contributes to video shake i.e. unwanted movement in captured video sequences. This grip is also uncomfortable for extended periods of time and, as it is relatively unstable, could lead to the user dropping, and damaging, the mobile station. Therefore, there is a need for a mobile communication station that can provide a comfortable, stable grip for filming.

It is envisaged that mobile stations having a video capture capability could also be capable of video streaming i.e. sharing 'live' video images during a call. The mobile stations would thus be capable of making/receiving phone calls, video streaming and capturing longer periods of video whilst not in call. Therefore, a mobile station that can capture video images while permitting the user to operate the keypad to make/receive calls, compose text messages, play games etc. is required. As such, there is a need for a mobile station that combines the best ergonomic grip for video capture whilst still allowing the user to operate the keypad.

According to the present invention, there is provided a mobile communication station including a camera and having a grip for being gripped by a user during use of the communication station, the grip having a first compact configuration and a second configuration in which the grip is expanded relative to the first configuration to improve the grip of the user on the communication station when the grip is in the second expanded configuration.

Preferably, the mobile communication station has a body portion to which the grip is attached and with respect to which the grip is movable.

The body portion may house operational components of the communication station.

The body portion of the mobile communication station may include the camera.

User input and/or output components of the communication station may be exposed on the surface of the body portion.

Preferably, the grip of the mobile communication station is rotatable relative to the body portion.

In one embodiment of the present invention, the grip is rotatable relative to the body portion about an axis substantially parallel to the direction in which the camera points, so as to project from the body portion.

In another embodiment of the present invention, the grip is rotatable relative to the body portion about an axis substantially perpendicular to the direction in which the camera points, so as to project from the body portion.

The mobile communication station may be arranged such that in at least one rotational position the grip extends continuously from the body in the direction of the axis of rotation.

The grip may be slidable relative to the body portion.

Preferably, the grip has a core portion and at least one outer wall movable away from the core portion, and wherein in moving from the first compact configuration to the second expanded configuration the or each wall is moved away from the core portion.

Preferably, the mobile communication station is capable of operating as a mobile telephone.

In an embodiment of the present invention, the mobile communication station is capable of sensing relative motion of at least a part of the grip portion and another part of the mobile communication station, and in response switching from a first operating mode to a second operating mode.

User input and/or output components of the communication station may be exposed on the surface of the grip.

Preferably, the grip portion is movable relative to the direction in which the camera points so as to be capable of adopting a position in which the user input and/or output components of the communication station are exposed on the surface of the grip face in substantially the opposite direction to that in which the camera points.

In an embodiment of the present invention, changing the configuration of the grip from the first compact configuration to the second expanded configuration can make available an additional user interface for controlling the operation of the mobile communication station.

The grip may house operational components of the mobile communication station.

The grip may be electrically connected to the main body of the mobile communication station.

According to an aspect of the present invention there is provided a mobile communication station having a body that is relatively elongate about an axis, the body comprising two portions which are mechanically coupled to each other by a linkage that permits rotation of one of the portions relative to the other about an axis parallel or substantially parallel to the said axis and prevents rotation of each portion relative to the other about other axes. Preferably one of the portions includes a camera. Preferably the other of the portions includes a display. In this way, preferably the portions can be manipulated so that the display and the camera can both face a user. The display and the camera preferably both point or face in a direction perpendicular or substantially perpendicular to the axis of rotation.

For a better understanding of the present invention, reference is made to the following drawings in which.

Figure 1A:
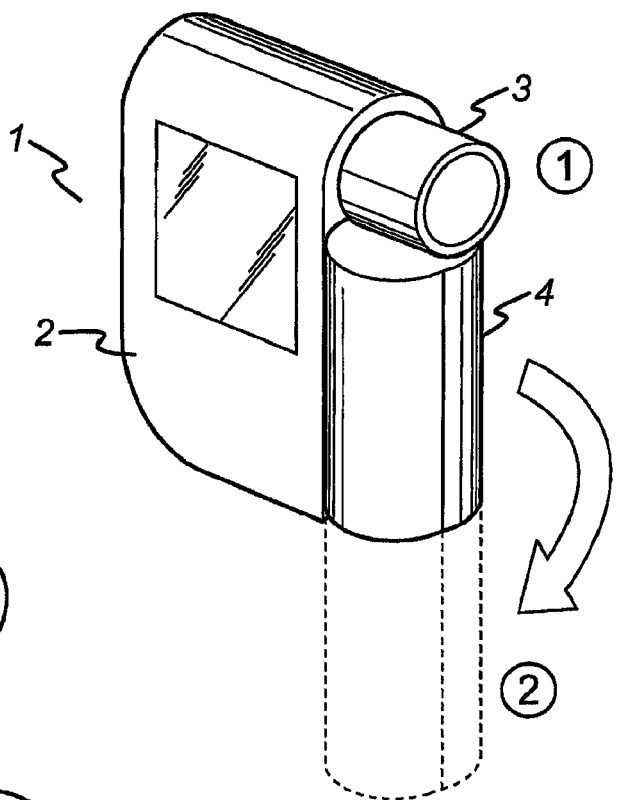
FIG. 1 shows a mobile station having a side hinged grip that can be extended in thickness.

A mobile station as shown in the figures achieves an improved grip for the user of the mobile station through being provided with a grip feature. The grip feature is connected to the main body of the mobile station by means of a connection, the connection being such that the grip feature is moveable with respect to the main body of the mobile station. The connection could typically be a pivot, a hinge, or a sliding arrangement etc. The grip feature may contain functional components, especially functional electronic components, of the mobile station.

The mobile station also contains a user interface, which would typically comprise at least a display (or other output device) and a keypad (or other input device). The user is able to make and receive calls, send text messages and play games etc by means of the user interface.

In addition, the mobile station according to the present invention would have a video capture device such as a camera, having a viewfinder, a lens, a memory, zoom, associated circuitry etc.

The grip feature enables the mobile station to assume two spatial forms. In its first form the mobile station has a relatively compact arrangement, similar to the conventional arrangement of a mobile station. In this form the mobile station is designed to fit comfortably within the user's hand during calls. The ergonomics of the mobile station in this form are well suited for making and receiving calls. This form further has a compact representation, making it light and easy to carry within a user's pocket, handbag etc.

The second spatial form of the mobile station is arranged so as to provide an improved ergonomic design well suited for video capture. During video capture it is preferred that the user is provided with a stable grip for holding the mobile station, to avoid movement in the resulting video images. The grip should also allow the user to hold the mobile station in a suitable orientation for capturing images. This may, for example, involve the user to looking through a viewfinder during video capture.

In embodiments of the present invention, the improved grip for video capture is achieved through mechanical movement and enlargement of the grip feature. The grip feature is preferably arranged such that it can be manipulated by the user, although it could move under automatic control of the mobile station on detecting a change in operating mode between a communication mode and a camera mode. This manipulation would typically be achieved through two stages: the first stage involving moving the grip feature in relation to the main body of the mobile station in order to achieve an optimal spatial arrangement of the grip and the second stage involving some form of expansion or extension of the grip feature in order to improve the stability and comfort of the user's grip on the mobile station. The mobile station could sense movement of the grip feature and in response switch from one operating mode to another: for instance it could enter a camera mode when the grip portion is moved to a position adapted for stable holding and a phone mode when it is moved to a compact position.

During the first stage of manipulation, the user moves the grip feature about the connection between the grip feature and the main body of the mobile station. This would typically involve some form of mechanical movement or translation, for example, twist/pivot, slide, pop-up or fold.

During the second stage of manipulation, the grip feature forms a 'power grip' by enlarging. In this form the grip feature can be enclosed within the user's hand during filming rather than being held between the thumb and other fingers. The enlargement can be achieved, for example, by the outer surfaces of the grip feature extending by mechanical means. Alternatively, the length of the grip feature could be mechanically extended. Both of these examples are illustrated in FIGS. 1 to 3, which are described below. The present invention is not limited to these examples, but encompasses any method by which the grip feature can be expanded so as to provide an improved grip for the user. The grip feature of the present invention not only renders the hold that the user has on the mobile station more stable, so that unwanted movement in the video image becomes less noticeable, but also provides a more comfortable grip. This is of particular relevance when a user wishes to record video images for an extended period of time. Also, as the grip is more stable, the user is less likely to drop the mobile station and therefore damage it.

FIGS. 1 to 3 illustrate examples of mobile stations having configurable grip features according to embodiments of this invention.

FIG. 1 illustrates a mobile station having a side hinged grip, which can be extended in thickness.

Figure 1B:
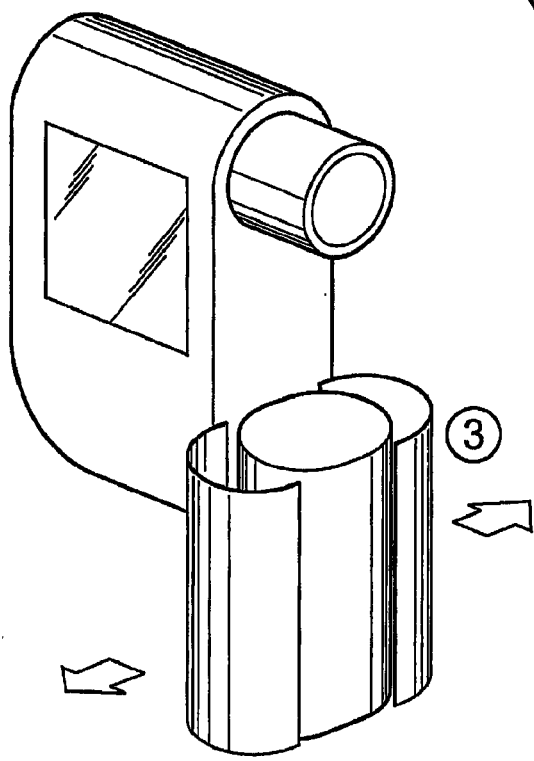
Figure 1C:
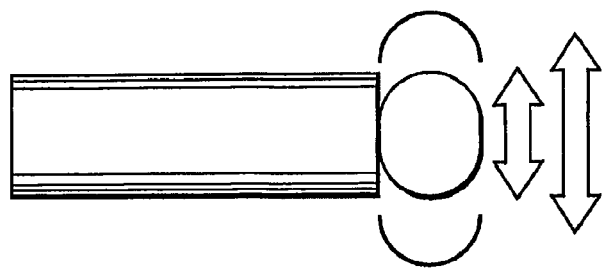

FIG. 1a shows the mobile station in the first compact arrangement. The mobile station (1) has a main body (2) having a video capture device (3) and a grip feature (4). The user changes the configuration of the mobile station by rotating the grip feature through a predetermined angle (probably 180°, as shown in steps 1 and 2 of the figure). This results in the arrangement shown in FIG. 1b, with the grip feature protruding from the main body of the mobile station. The outer surfaces of the grip feature are extended outwards mechanically in step 3, which is also shown in FIG. 1b. This is further illustrated in FIG. 1c. The grip feature of FIG. 1 provides better stability because it can be clenched by a user with his fingers wrapped around it. The radial expansion of the grip feature can allow this to be done more comfortably, especially when the width of the grip feature in its unexpanded configuration is small.

FIG. 2 shows a further embodiment of the present invention, in which the mobile station has a bottom hinged grip and can be extended in thickness.

Figure 2A:
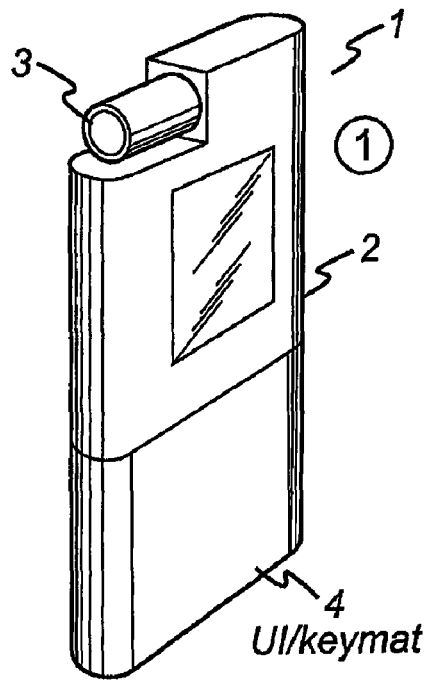
FIG. 2 shows a mobile station having a bottom hinged grip that can be extended in thickness.
Figure 2B:
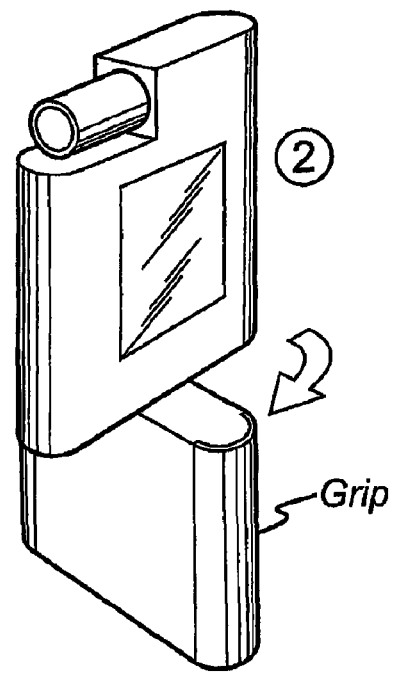
Figure 2C:
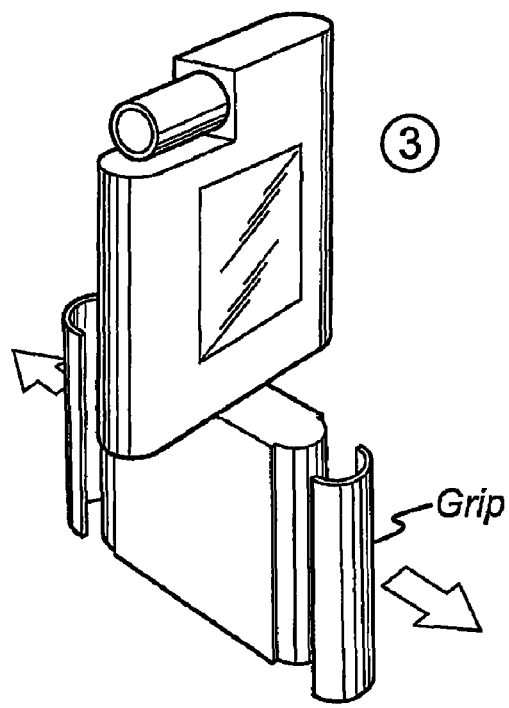
Figure 2D:
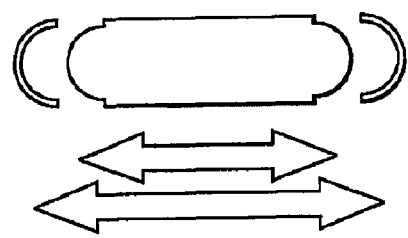

FIG. 2a illustrates the mobile station (1) in its compact representation. In this implementation the user interface and/or keypad is contained within the grip feature (4), which forms the bottom portion of the mobile station. FIGS. 2b and 2c show the bottom portion of the mobile station i.e. the grip being rotated through a predetermined angle (probably 90°) in steps 1 and 2, so that the grip can be held within the hand rather than between the thumb and the fingers. As before, the outer surfaces of the grip are extendible so as to improve the ergonomic arrangement of the mobile station. The extended arrangement is illustrated in FIGS. 2c and 2d.

FIG. 3 shows a further embodiment of the present invention, in which the mobile station has a bottom hinged grip and can be extended in length.

Figure 3A:
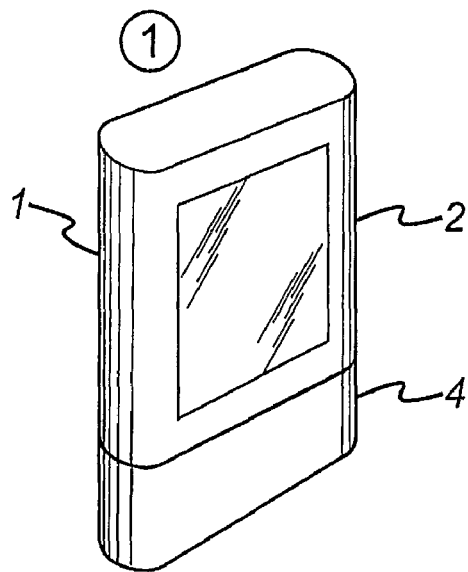
FIG. 3 shows a mobile station having a bottom hinged grip that can be extended in length.
Figure 3B:
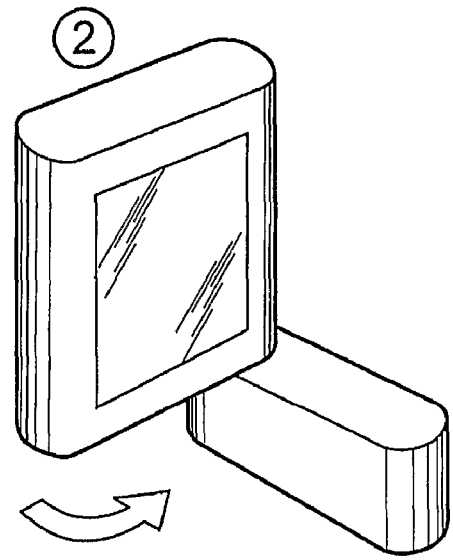

FIG. 3a shows the mobile station in its compact representation, as before. FIG. 3b illustrates the grip portion (4) of the mobile station (1) being rotated through a predetermined angle (probably 90°) and FIG. 3c illustrates the grip being optimised for being held by the user by extending the length of the grip.

In each embodiment the grip feature 4 could include functional components of the mobile station. User interface components of the mobile station, such as a display and/or keys could be exposed on the outer surface of the grip feature. Such user interface components be turned with the grip feature so that they face the user during camera operation, enhancing usability of the camera.

Features of the embodiments could be combined together. The grip feature of FIG. 2 could be telescopic as is the grip feature of FIG. 3. The hinge point of the grip feature of FIGS. 2 and 3 could be in any suitable location. The grip feature of FIG. 3 could be laterally as well as vertically expandable.

Figure 3C:
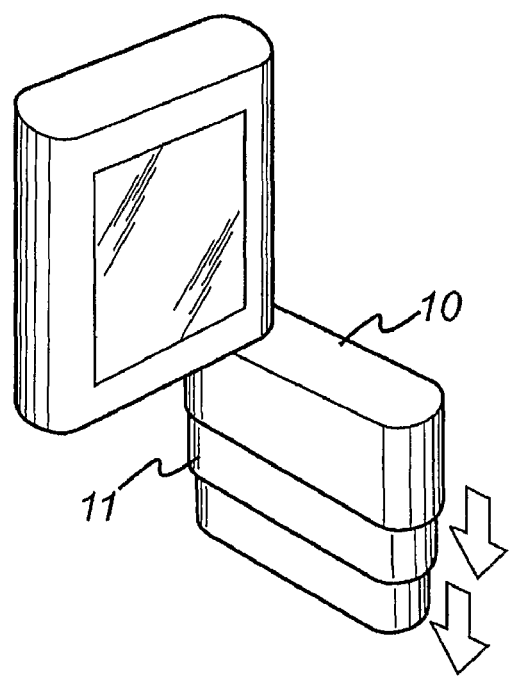

Changing the configuration of the mobile station by rotating and/or extending the grip feature may expose a surface of the mobile station that was previously covered or inaccessible (e.g. surfaces 10, 11 in FIG. 3c). As the configuration of the mobile station is changed in order to provide an optimal configuration for operating the mobile station in a particular mode, this surface could be used to provide additional user controls for that mode. For example, the controls could allow the user to control the operation of the mobile station in the video capture mode. The controls could provide control functions such as record, mode select or rewind/fast forward.

Although the mobile station according to the present invention is arranged to have an expanded configuration, it is important that the mobile station is still able to adopt the conventionally small size of mobile stations in its compact configuration. Therefore, according to an advantageous embodiment of the present invention, the volume within the grip feature is used to hold components such as batteries or circuitry. In such an embodiment it is necessary for electrical connections to be provided between the grip feature and the body of the mobile station. Hinge technologies that incorporate wires or printed circuit boards to provide an electrical connection are already used within existing consumer electrical products such as cameras or camcorders.

Future mobile stations will be capable of video streaming i.e. transmitting 'live' video images during a call. It is therefore important that a mobile station having a configurable grip according to the present invention is capable of multi-tasking, with the video capture functions and call functions being implemented simultaneously. Therefore, according to a further embodiment of the invention, the mobile station is arranged such the user is able to operate the keypad, irrespective of the spatial configuration of the grip. This allows the user to operate the keypad whilst the mobile station is in video capture mode, enabling the user to make/receive calls, compose text messages and play games etc by operating the keypad while filming.

According to a preferred embodiment, the keypad of the mobile station does not require any additional keys for operating the mobile station as a video capture device.

By selecting a suitable material from which to manufacture the grip, the stability and comfort of the grip feature may be further enhanced.

The mobile station is suitably capable of communication with other devices, preferably wireless communication and most preferably radio communication. The mobile station is preferably capable of use as a mobile telephone, preferably for concurrent real-time transmission of a user's voice and real-time reception and replay of received voice data. The mobile station preferably has a microphone for detecting audio signals and a loudspeaker for replaying audio signals. The microphone and loudspeaker are preferably located on the mobile station such that they can be conveniently held to a user's ear and mouth for communication purposes in at least one configuration of the mobile station.

The present invention is not limited to enhancing video/camera functionality of a mobile device; it could also be used to enhance gaming or editing functions or any application where a grip feature could be expanded to improve the user grip.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A mobile communication station including a camera and having a body having a longest dimension along a first axis, the body comprising two portions which are mechanically coupled to each other by a linkage that permits rotation of one of the portions relative to the other about an axis substantially parallel to the said first axis and prevents rotation of each portion relative to the other about other axes, one of said portions having a grip for being gripped by a user during use of the communication station, the grip having a first compact configuration and a second configuration in which the grip is expanded relative to the first configuration to improve the grip of the user on the communication station when the grip is in the second expanded configuration; and wherein the grip has a core portion and at least one outer wall movable away from the core portion, and wherein said grip has a longest dimension along a second axis and wherein when moving from the first compact configuration to the second expanded configuration the at least one outer wall is moved linearly away from the core portion in a direction substantially perpendicular to the second axis.

2. A mobile communication station as claimed in claim 1, wherein the grip is movable with respect to the body of the mobile communication station.

3. A mobile communication station as claimed in claim 2, wherein the body houses operational components of the communication station.

4. A mobile communication station as claimed in claim 3, wherein the body includes the camera.

5. A mobile communication station as claimed in claim 3, wherein user input and/or output components of the communication station are exposed on the surface of the body.

6. A mobile communication station as claimed in claim 2, wherein the grip is rotatable relative to the body.

7. A mobile communication station as claimed in claim 4, wherein the grip is rotatable relative to the body about an axis substantially parallel to the direction in which the camera points, so as to project from the body.

8. A mobile communication station as claimed in claim 4, wherein the grip is rotatable relative to the body about an axis substantially perpendicular to the direction in which the camera points, so as to project from the body.

9. A mobile communication station as claimed in claim 8, wherein in at least one rotational position the grip extends continuously from the body in the direction of the axis of rotation of the grip.

10. A mobile communication station as claimed in claim 2, wherein the grip is slidable relative to the body.

11. A mobile communication station as claimed in claim 1, wherein in the mobile communication station is capable of operating as a mobile telephone.

12. A mobile communication station as claimed in claim 11, the mobile communication station is capable of sensing relative motion of at least a part of the grip and another part of the mobile communication station, and in response switching from a first operating mode to a second operating mode.

13. A mobile communication station as claimed in claim 1, wherein user input and/or output components of the communication station are exposed on the surface of the grip.

14. A mobile communication station as claimed in claim 13, wherein the grip is movable relative to the direction in which the camera points so as to be capable of adopting a position in which the user input and/or output components of the communication station are exposed on the surface of the grip face in substantially the opposite direction to that in which the camera points.

15. A mobile communication station as claimed in claim 1, wherein changing the configuration of the grip from the first compact configuration to the second expanded configuration makes available an additional user interface for controlling the operation of the mobile communication station.

16. A mobile communication station as claimed in claim 1, wherein the grip houses operational components of the mobile communication station.

17. A mobile communication station as claimed in claim 16, wherein the grip is electrically connected to the main body of the mobile communication station.

18. A mobile communication station as claimed in claim 1, wherein one of the portions includes a camera.

19. A mobile communication station as claimed in claim 18, wherein the other of the portions includes a display.

20. A mobile communication station as claimed in claim 1, including gaming or editing functions.

21. A mobile communication station as claimed in claim 1, wherein the at least one outer wall is moveable away from the core portion in a direction substantially perpendicular to the first axis.

22. A method comprising: providing a mobile communication station including a camera and having a body having a longest dimension along a first axis, the body comprising two portions which are mechanically coupled to each other by a linkage that permits rotation of one of the portions relative to the other about an axis substantially parallel to the said first axis and prevents rotation of each portion relative to the other about other axes, one of said portions having a grip configured to be gripped by a user during use of the communication station, the grip having a first compact configuration and a second configuration in which the grip is expanded relative to the first configuration to improve the grip of the user on the communication station when the grip is in the expanded configuration; and wherein the grip has a core portion and at least one outer wall movable away from the core portion, wherein said grip has a longest dimension along a second axis and wherein when moving from the first compact configuration to the second expanded configuration the at least one outer wall is moved linearly away from the core portion in a direction substantially perpendicular to the second axis.

23. A method as claimed in claim 22, wherein the at least one outer wall is moveable away from the core portion in a direction substantially perpendicular to the first axis.

* * * * *